Sept. 5, 1961  D. TELESCA  2,998,899
MULTIPLE COMPARTMENT CARRIER FOR BEVERAGE CONTAINERS
Filed June 9, 1958
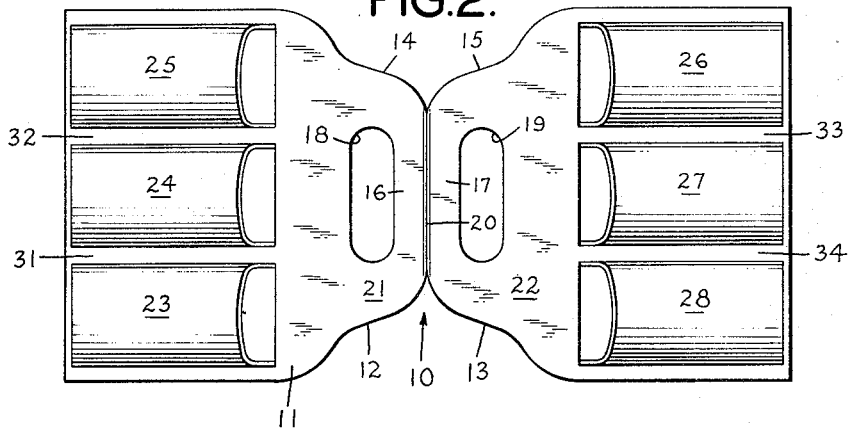
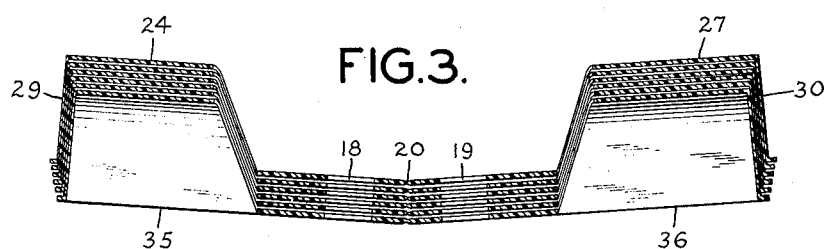
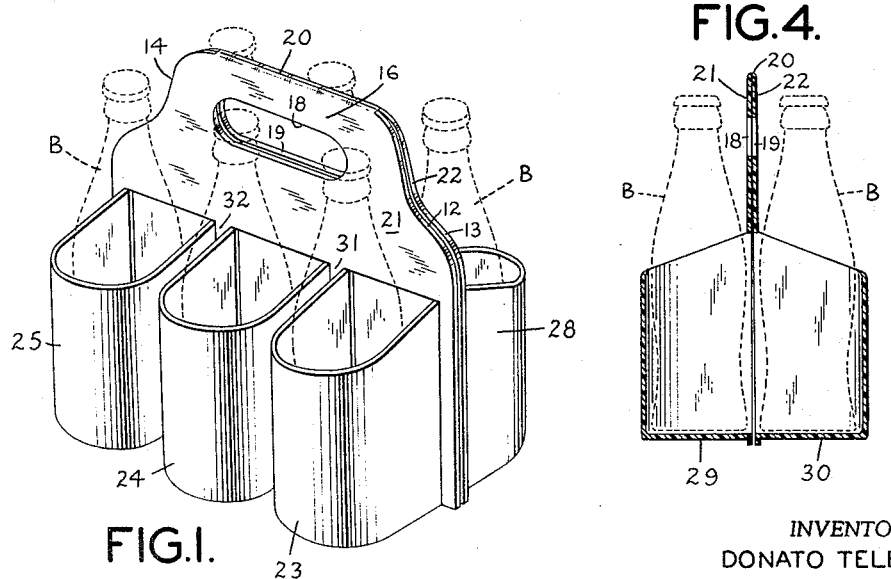
INVENTOR.
DONATO TELESCA
BY
HIS ATTORNEYS

2,998,899
MULTIPLE COMPARTMENT CARRIER FOR BEVERAGE CONTAINERS
Donato Telesca, Old Forge, Pa., assignor to Consolidated Molded Products Corporation, Scranton, Pa., a corporation of Delaware
Filed June 9, 1958, Ser. No. 740,946
2 Claims. (Cl. 220—102)

This invention relates to devices for carrying small articles and it relates particularly to an improved type of carrier for cans, bottles, jars and other containers for beverages, foodstuffs and the like.

Carriers have been provided heretofore to receive a plurality of bottles or cans of beer, carbonated beverages and the like, these carriers being formed of cardboard and including a central folded hand grip and box-like extensions on opposite sides of the hand grip for receiving a plurality of containers such as, for example, three cans or bottles in each compartment. These carriers are commonly known as "six packs." They are entirely practical for carrying a plurality of such bottles or cans but they do have certain disadvantages. Inasmuch as they are formed of cardboard or similar material, they are not very durable and, as a matter of fact, are usually discarded after having being used to take filled, reusable containers home and return the empty containers to the store. Cardboard tends to absorb water and become stained or dirty very quickly. If the bottom of the carrier gets wet the bottom may drop out of the carrier thereby dropping the containers, and if they are glass bottles, usually breaking one or more of them. Moreover, while the carriers are disposable items, they are not inexpensive and they add materially to manufacturing and distribution costs.

In accordance with the present invention, a carrier for beverage and foodstuff containers is provided which is of a reusable type which is strong, durable and attractive and can be made at relatively low cost in large quantities as required.

More particularly, the new container carrier is formed of a suitable moldable plastic material, preferably a resilient plastic, such as polyethylene, a vinyl or polyvinyl resin, or the like, which is moldable under heat and pressure so that the resulting carrier is unaffected by moisture, can be easily washed and reconditioned for use, is tough and is more durable than cardboard or paper carrier, hence is reusable many times before it is discarded. By appropriate selection of the plastic, it is possible to provide the carriers in any desired colors and to imprint on the carriers advertising or decorative material as may be desired. Moreover, by suitable formation of the new carrier, in accordance with the invention, it is possible to stack the carriers compactly, thereby allowing large numbers of them to be packed in relatively small spaces, and facilitating and reducing the cost of packing and distributing the carriers.

Inasmuch as the carriers are reusable, they can be handled in the same manner as returnable bottles, that is, a small charge may be made for the carrier and the empty bottles, which is refunded when the carrier and the empty bottles are returned by the consumer. In this way, the cost of the carrier to the ultimate consumer is eliminated and the cost of the carriers to the beverage manufacturers and distributors is reduced very substantially.

For a better understanding of the present invention, reference may be had to the accompanying drawing in which:

FIGURE 1 is a perspective view of a typical carrier embodying the present invention;

FIGURE 2 is a plan view of the carrier shown in an open condition;

FIGURE 3 is a view in section through a stack of the carriers showing the manner in which they are stacked for transportation or shipment, and FIGURE 4 is a view of the carrier in cross section.

Carriers of the type described in greater detail hereinafter and embodying the present invention can be formed by a suitable molding operation such as, for example, an injection molding operation or by a vacuum or pressure molding operation in which a sheet of pliable plastic material is shaped over a form by applying unequal pressures to opposite sides of the sheet. Both types of molding operations are well known and require no further discussion herein.

As shown in FIGURE 2, a typical carrier 10 is composed of a single sheet 11 of suitable moldable plastic such as polyethylene, vinyl resin, vinylidene resin, or other thermoplastic and resilient, resinous material of an appropriate thickness. The sheet 11 may be rectangular or it may be provided with inwardly curved edges 12, 13, 14, 15 which define the shape of handle-forming portions 16 and 17 of the carrier at the midportion of the sheet. Also formed in the handle portions 16 and 17 are a pair of holes 18 and 19 which are adapted to be aligned for receiving the fingers when the sheet is folded substantially on its transverse center line. As best shown in FIGURE 3, the plastic material along the transverse center line of the sheet is reduced in thickness to form an integral flexible hinge 20 enabling the two sheet sections 21 and 22 on opposite sides of the hinge 20 to be folded into substantially face-to-face engagement as shown in FIGURES 1 and 4.

A plurality of areas of the sheet 11 are displaced out of the plane of the sheet to form a series of pockets 23, 24, 25, 26, 27 and 28 which are adapted to receive containers such as, for example, the bottles B shown in FIGURES 3 and 4. The outer wall of each of the pockets 23 to 28 is of a generally loop-like or U-shaped cross section and has its lower edge joined to a bottom 29, 30, etc. integral with the wall of the pocket and the corresponding section 21 or 22 of the sheet 11, as shown in FIGURES 3 and 4. Inasmuch as the pocket portions are formed of relatively thin material, and are located in side-by-side relation transversely of the sections 21 and 22 it is desirable to reinforce them. To that end, webs 31, 32, 33, 34 forming parts of the sheet 11, are joined to the edges of the pockets thereby securely anchoring the pockets against displacement by the weight of the bottles or other containers therein.

In forming the pockets 23—28, the plastic material is omitted or displaced at the inside of the pockets in the plane of the sheet 11 so that each pocket has an open side 35, 36, etc. The provision of the open sides or openings reduces the amount of material required to make the carrier and provides additional advantages. Inasmuch as the inner sides of the pockets are open and the sides of the pockets are somewhat flexible, it is possible to stack the carriers one on top of the other as shown in FIGURE 3. By slightly bending the hinge 20, the pockets of the carriers will fit together in telescopic relation, thereby enabling a large number of such carriers to be stacked in a relatively small space.

Inasmuch as the carriers are formed of a plastic material, they are durable and are reusable many times before being discarded. Moreover, they can readily be scrubbed or cleaned so that they retain a fresh new appearance even after repeated use and thus are more economical and at the same time more attractive and more useful than the carriers heretofore provided.

It will be understood that the carriers may be formed of plastic materials of different colors or they may be dyed or imprinted with advertising or ornamental material as may be required. Moreover, they can be made in various sizes and for receiving and transporting various types of containers.

Accordingly, the form of carrier disclosed herein should be considered as illustrative and not as limiting the scope of the following claims.

I claim:

1. A carrier for a plurality of containers comprising a pair of thin sheets of plastic in face-to-face relation, an integral flexible hinge connecting one edge of one sheet to one edge of the other sheet, each of the sheets having a plurality of substantially parallel openings therein of generally rectangular shape, said openings being spaced from said hinge and having a pair of opposite edges substantially perpendicular to said hinge means, the openings in one sheet substantially coinciding with the openings in the other sheet and molded pocket-forming members integral with each of said sheets and overlying said openings and extending outwardly from said sheets to receive containers, each pocket-forming member including an outer side wall of U-shaped cross-section having opposite ends and substantially parallel, straight side edges, said side edges of each wall being united with one of said sheets at said pair of opposite edges of an opening, each pocket-forming member also having a bottom wall united with said sheet at one end of said one of said openings and with the end of said sidewall remote from said hinge and means forming a hand hold for said carrier.

2. A container carrier comprising a sheet of plastic material folded along a fold line transversely thereof to dispose two portions thereof in substantially face-to-face relation, each of said sheet portions having at least one substantially rectangular opening therein spaced from said fold line and having a pair of its edges substantially perpendicular to said fold line, a thin wall member of U-shaped cross-section having opposite ends and substantially parallel, straight side edges, said side edges being united with a sheet portion at said pair of edges of said opening, a bottom wall united with said sheet at the end of said opening remote from said fold line and with one end of said wall member, the opposite end of said wall member adjacent to said fold line being open, and means associated with said sheet forming a hand hold for said carrier.

References Cited in the file of this patent

UNITED STATES PATENTS

| | | |
|---|---|---|
| 2,089,297 | Read et al. | Aug. 10, 1937 |
| 2,690,593 | Abercrombie | Oct. 5, 1954 |
| 2,750,028 | Bode et al. | June 12, 1956 |
| 2,821,327 | Glazer | Jan. 28, 1958 |
| 2,834,686 | Reuman | May 13, 1958 |
| 2,888,164 | Corwin | May 26, 1959 |
| 2,896,814 | Altenburg | July 28, 1959 |

FOREIGN PATENTS

| | | |
|---|---|---|
| 705,279 | Great Britain | Mar. 10, 1954 |